(12) United States Patent
Gras

(10) Patent No.: US 11,003,756 B2
(45) Date of Patent: May 11, 2021

(54) SYSTEM AND METHOD FOR VERIFYING UNIQUE USER IDENTIFICATION

(71) Applicant: Seaton Gras, Seattle, WA (US)

(72) Inventor: Seaton Gras, Seattle, WA (US)

( * ) Notice: Subject to any disclaimer, the term of this patent is extended or adjusted under 35 U.S.C. 154(b) by 0 days.

(21) Appl. No.: 16/938,938

(22) Filed: Jul. 25, 2020

(65) Prior Publication Data

US 2021/0026944 A1 Jan. 28, 2021

Related U.S. Application Data

(60) Provisional application No. 62/878,644, filed on Jul. 25, 2019.

(51) Int. Cl.
  *G06F 21/36* (2013.01)
  *G06F 21/45* (2013.01)
  *G06F 21/31* (2013.01)

(52) U.S. Cl.
  CPC ............ *G06F 21/36* (2013.01); *G06F 21/316* (2013.01); *G06F 21/45* (2013.01); *G06F 2221/2111* (2013.01); *G06F 2221/2133* (2013.01)

(58) Field of Classification Search
  CPC ........ G06F 21/30; G06F 21/36; G06F 21/316; G06F 21/45; H04L 9/3226; H04L 63/083
  See application file for complete search history.

(56) References Cited

U.S. PATENT DOCUMENTS

| 6,980,081 | B2 | 12/2005 | Anderson | |
| 7,877,612 | B2* | 1/2011 | McKeeth | G06F 21/36 713/186 |
| 8,117,458 | B2* | 2/2012 | Osborn, III | G06F 21/36 713/183 |
| 8,638,939 | B1* | 1/2014 | Casey | G06F 21/36 380/277 |
| 8,655,027 | B1* | 2/2014 | Olthoff | G06F 21/36 382/118 |
| 8,782,775 | B2* | 7/2014 | Fadell | G06F 3/0416 726/16 |
| 8,959,619 | B2 | 2/2015 | Sanft et al. | |
| 9,497,312 | B1* | 11/2016 | Johansson | H04L 63/083 |
| 10,169,566 | B1* | 1/2019 | Mossoba | H04L 9/3226 |
| 10,394,415 | B2* | 8/2019 | Chan | G06F 3/04886 |
| 2009/0038006 | A1* | 2/2009 | Traenkenschuh | G07C 9/33 726/21 |
| 2009/0064321 | A1* | 3/2009 | Dick | H04L 63/107 726/21 |
| 2009/0284344 | A1* | 11/2009 | Craymer | G07C 9/33 340/5.54 |

(Continued)

OTHER PUBLICATIONS

W. Jansen, Authenticating mobile device users through image selection, WIT Press. (Year: 2004).*

*Primary Examiner* — Shanto Abedin
(74) *Attorney, Agent, or Firm* — Christopher Mayle; Thomas E. LaGrandeur; Bold IP, PLLC

(57) ABSTRACT

A system and method that provides the ability for users to select, create, and upload a collection of graphical images whereby a web site login process presents the user with an array of graphical images including the graphical images designated for an authentication pattern, the graphical image authentication system then determines that the graphical images chosen by the user are correct or incorrect without notifying the user until the process is complete.

17 Claims, 10 Drawing Sheets

(56) References Cited

U.S. PATENT DOCUMENTS

| | | | |
|---|---|---|---|
| 2010/0043062 A1 | 2/2010 | Alexander et al. | |
| 2010/0169958 A1* | 7/2010 | Werner | G06F 21/36 726/6 |
| 2012/0005483 A1* | 1/2012 | Patvarczki | G06F 21/36 713/182 |
| 2012/0092286 A1* | 4/2012 | O'Prey | G06F 3/04883 345/174 |
| 2013/0347087 A1* | 12/2013 | Smith | G06F 21/36 726/7 |
| 2015/0227180 A1* | 8/2015 | Rabii | G06F 1/3203 713/323 |
| 2015/0281215 A1* | 10/2015 | Zia | H04L 63/083 726/7 |
| 2016/0219036 A1* | 7/2016 | Devkar | H04L 63/083 |
| 2018/0137268 A1* | 5/2018 | Sawant | G06F 21/316 |
| 2020/0104475 A1* | 4/2020 | Guionneau | G06F 21/36 |

* cited by examiner

SYSTEM AND METHOD FOR VERIFYING UNIQUE USER IDENTIFICATION

CROSS REFERENCE TO RELATED APPLICATIONS

The following is a non-provisional patent application claiming priority to U.S. provisional patent application 62/878,644 filed on Jul. 25, 2019, which is incorporated by reference in its entirety.

FIELD OF DISCLOSURE

The overall field of this invention relates generally to the field of identification authentication. In particular, the invention is directed to an identity authentication system using verification through a sequential selection of graphical images and/or text terms.

BACKGROUND

Every day millions fall victim of some form of identity theft. According to Privacy and American Business, 1 out of 5 Americans have fallen victim to some form of identity theft. Whether it is as simple as someone accessing a social media profile that was left active on a public computer or someone gaining access to a credit card from a personal or group security breach. One of the biggest reasons for this is the human element. The majority of passwords are extremely easy to remember or have been used throughout multiple sites even though passwords make up a critical part of our life in the age of the Internet. Passwords can be obtained through trickery like phishing attacks over email. Computer hackers have also found all sorts of ways to crack codes, find vulnerabilities, and bypass security barriers. These break-ins then create other layers of damages and exposure representing billions, perhaps trillions in dollars of damages.

Oftentimes, passwords have also been artificially created by computer programs and are stored in keychain passwords but these can be "sniffed" or read over Wi-Fi using scripts. Really well-written passwords are also harder to remember and usually are difficult to type, especially on a mobile device keyboard, which is now the most commonly used computing device among the general public. Thus, the stronger the password, the more difficult to type or remember.

There are other established ways for identifying the user's authentication such as utilizing biometric data from a thumbprint or a retinal scan. However, biometric data does not work 100% of the time and can be thrown off by something as simple as dirty fingers. This also can take extended amounts of time because the conversion of multiple biometric data into hash strings. Face recognition is also used but this can also be time consuming and there are documented issues with the technology authenticating users with similar facial structures, especially common with close family members such as twins.

Another problem with most authentication systems is that they actually verify if the password entered is correct or incorrect enabling a third party to understand and adjust to a negative response by entering a different password. This allows a third party such as a hacker to continue to try entering a series of different passwords because they are able to receive feedback each time the hacker enters a password.

Thus, exists a need for improving upon the verification of unique identification whereby the creator may design passwords that are complex to anyone other than the creator while being simple to understand and processed within a short amount of time.

SUMMARY

The disclosure presented herein relates to a system for creating one or more authentication patterns, the system comprising: one or more processors configured for: receiving, one or more images from a user for an authentication pattern, the authentication pattern comprising one or more designated images; maintaining a data structure that associates the one or more designated images with the user, creating, an assortment of images on one or more grids, the assortment of images comprising the one or more designated images from the user, presenting a first grid to the user, performing analysis on a first image selected by the user in the first grid to determine if the selected first image is related to the authentication pattern, presenting an additional grid to the user, such that the user is not presented with a notification that the selected first image in the first grid was related to the authentication pattern or was not related to the authentication pattern, performing analysis on an additional image selected by the user in the second grid to determine if the selected second image is related to the authentication pattern, providing access if a predetermined amount of the selected images by the user are related to the authentication pattern, providing access if the selected images of the authentication pattern were selected in a specific order by the user, delaying the time between presented grids to the user by a predetermined amount of time if user has selected an image that was not related to the authentication pattern, increasing the time between presented grids to the user by a predetermined amount of time each time the user has selected an image that was not related to the authentication pattern, providing access if a predetermined percentage of the selected images by the user are related to the authentication pattern, determining if the user is within a predetermined time or geographic area, presenting, in response to the user not within a predetermined time or geographic area, a grid without designated images, wherein the designated images are uploaded by the user, the processors are further configured for: assigning a positive point value for an image selected by the user that is related to the authentication pattern, assigning a negative point value for an image selected by the user that is not related to the authentication pattern, determining if a current point value is above a predetermined number, and providing access if the current point value is above the predetermined number.

The disclosure presented herein also relates to a system for creating one or more authentication patterns, the system comprising, using one or more processors configured for, receiving, one or more elections from a user for an authentication pattern; the authentication pattern comprising one or more designated elections, maintaining a data structure that associates the one or more designated elections with the user, creating, an assortment of the elections on one or more grids, the assortment of elections comprising the one or more designated elections from the user, presenting a first grid to the user, performing analysis on a first selection selected by the user in the first grid to determine if the first selection is related to the authentication pattern, presenting an additional grid to the user, such that the user is not presented with a notification that the selected first selection in the first grid was related to the authentication pattern or was not related to the authentication pattern, performing analysis on an additional selection selected by the user in the second grid to determine if the selected second selection is related to the authentication pattern, providing access if a predetermined amount of the selections by the user are related to the authentication pattern, providing access if the selections of the authentication pattern were selected in a specific order by the user, delaying the time between presented grids to the user by a predetermined amount if the selection by the user was not related to the authentication pattern, increasing the time between presented grids to the user by a predetermined amount each time the selection by the user was not related to the authentication pattern, determining if the user is within a predetermined time or geographic area, presenting, in response to the user not within a predetermined time or geographic area, a grid without designated images, assigning a positive point value for an image selected by the user that is related to the authentication pattern, assigning a negative point value for an image selected by the user that is not related to the authentication pattern, determining if a current point value is above a predetermined number, providing access if the current point value is above the predetermined number, wherein the one or more elections are musical notes, or wherein the one or more elections are numbers or words.

The disclosure presented herein also relates to a system for creating one or more authentication patterns, the system comprising, using one or more processors configured for, receiving, one or more elections from a user for an authentication pattern; the authentication pattern comprising one or more designated elections, maintaining a data structure that associates the one or more designated elections with the user, creating, an assortment of the elections on one or more grids, the assortment of elections comprising the one or more designated elections from the user, presenting a first selection to the user, receiving a gesture of the user on the first selection wherein a first type of gesture corresponds to the user determining the first selection is in the authentication pattern and an additional type of gesture corresponds to the user determining the first selection is not in the authentication pattern, performing an analysis, in response to the gesture, to determine if the user was correct in their determination that first selection was related to the authentication pattern or was not related to the authentication pattern, presenting an additional selection to the user, such that the user is not presented with a notification that the selected first selection was related to the authentication pattern or was not related to the authentication pattern, performing an analysis, in response to the gesture, to determine if the user was correct in their determination that the second selection was related to the authentication pattern or was not related to the authentication pattern, and providing access if a predetermined amount of correct determinations by the user.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION

Figure 1:
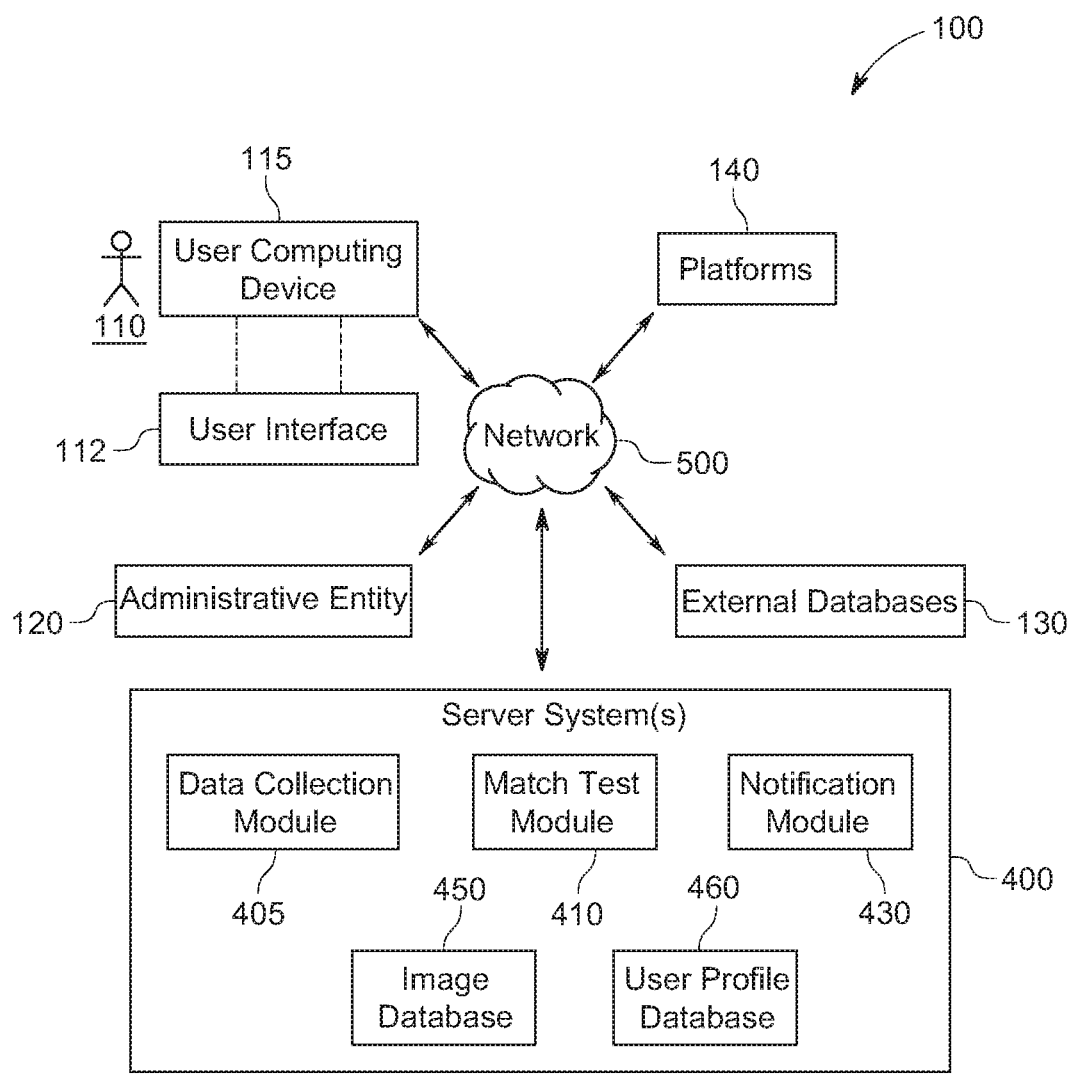
FIG. 1 depicts a schematic diagram of a user identification system, according to an illustrative embodiment.

In the Summary above and in this Detailed Description, and the claims below, and in the accompanying drawings, reference is made to particular features of the invention. It is to be understood that the disclosure of the invention in this specification includes possible combinations of such particular features. For example, where a particular feature is disclosed in the context of a particular aspect or embodiment of the invention, or a particular claim, that feature can also be used, to the extent possible, in combination with; and/or in the context of other particular aspects and embodiments of the invention; and in the invention generally.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

"Exemplary" is used herein to mean "serving as an example, instance, or illustration." Any aspect described in this document as "exemplary" is not necessarily to be construed as preferred or advantageous over other aspects.

Throughout the drawings, like reference characters are used to designate like elements. As used herein, the term "coupled" or "coupling" may indicate a connection. The connection may be a direct or an indirect connection between one or more items. Further, the term "set" as used herein may denote one or more of any items, so a "set of items" may indicate the presence of only one item, or may indicate more items. Thus, the term "set" may be equivalent to "one or more" as used herein.

The present disclosure recognizes the unsolved need for a system and method that provides the ability for users to select, create, and upload a graphical image collection whereby a web site login process presents the user with an array of graphical images including the graphical images from the graphical image collection. The graphical image authentication system then determines that the selected array of graphical images as chosen by the user is correct. The graphical image authentication system is used as an alternative method or in conjunction with the traditional username/password architecture to increase the overall level of security.

The invention is designed to incorporate a human's innate ability to quickly recognize graphical images. As someone selects the graphical image, which best matches their objective; they will take another step towards final authentication. Users may pick from a selection of graphical images or upload their own set of graphical images. These graphical images can then be woven into a matrix of other user-supplied graphical images or graphical images collected from various other sources. Each user can define the proper sequence of their graphical images to match their unique or personal thought process. Users may easily expand or modify the selected set of graphical images by uploading new graphical images or changing the sequence or pattern of display.

The graphical image authentication featured in the present invention delivers a fundamental shift in the way passwords are created and authenticated. This is because during the authentication process there aren't any visual cues or acknowledgement that the user has entered a wrong authenticator. An authenticator is the means used to confirm the identity of a user, that is, to perform digital authentication. A person authenticates to a computer system or application by demonstrating that he or she has possession and control of an authenticator. In the simplest case, the authenticator is a common password. After the user selects any wrong graphical image the appearance may remain unchanged, apart from the presentation of new images, and the user may continue viewing or scrolling through different matrixes and be none the wiser that they are selecting the correct graphical images in the image grid or sequence or are selecting the wrong images unless they know the specific combination of images. In fact, because one or more of the matrixes may have no correct graphical images that are within the password sequence, a user who does not know the authentication sequence might not even know they have initiated any steps in selecting a proper image sequence. The system also allows for different schemes such as the use of numeral algorithms, matching images, musical notes, or other criteria for the creation of an authentication pattern that would not be possible for another person to determine the user's thought process, logic or image sequence. The system is more analogous to an escape room where the room may have various objects but to solve the puzzles the user would have to understand first what is the puzzle. For instance predetermined objects in the room may have different colors as well as every other object in the room but only the user knows these item are of value to the authentication pattern because they were the person who created the pattern. This becomes further complicated when the objects also have many other qualities acting as distractions such as numbers written on them, what type of object they are, their location in the room, or a sound they make. This would be impossible without certain clues which are only stored in the user's mind and memory causing the puzzles to be unmanageable to solve for a third party.

Also, because this solution provides no text box doorway to the database, there is no way to do SQL injection. Using this method, there is no way to apply brute force to breakthrough the authentication process. And the user's steps and thought process are never recorded in any Keychain program. Also, there is no way to "save" the user's unique sequence, thus reducing the ability for hackers to gain access. Since the knowledge only exists in the user's mind, the solution can be processed equally across numerous devices such as a family member's computer, which doesn't have a password management system, without hesitation or frustration.

FIG. 1 is a block diagram of a user identification system constructed in accordance with the principals of the current invention. User Identification System 100 may include one or more types of content that may be stored, collected, extracted, or acquired from a number of users such as user 110 operating on a user's computing device such as user computing device 115 wherein graphical images are collected by graphical image database such as graphical image database 450 on a server such as server 400. Users 110 may be located in various physical locations that are either located apart or are located in the vicinity of one other. Users 110 of User Identification System 100 may access a user interface such as user interface 112 with user computing device 115. User interface 112 may have a plurality of buttons or icons that are selectable through user interface 112 by user 110 to instruct User Identification System 100 to perform particular processes in response to the selections.

In one or more non-limiting embodiments, User Identification System 100 may be innate, built into, or otherwise integrated into existing platforms such as a website, third-party program, iOS, Android, Snapchat, Getty Images, Instagram, Facebook, etc. User computing device 115 may acquire various forms of graphical images from input devices installed or connected to user computing device 115 such as cameras or applications that may be configured to generate graphical images to be uploaded to User Identification System 100. In one or more non-limiting embodiments, graphical images may already exist in User Identification System 100.

User computing devices 115 may be in communication with one or more servers 400 such as server 400 via one or more networks such as network 500. Server 400 may be located at a data center or any other location suitable for providing service to network 500 whereby server 400 may be in one central location or in many different locations in multiple arrangements. Server 400 may comprise a database server such as MySQL® or Maria DB® server. Server 400 may have an attached data storage system storing software applications and data. Server 400 may receive requests and coordinate fulfillment of those requests through other servers. Server 400 may comprise computing systems similar to user computing devices 115.

In one or more non-limiting embodiments, network 500 may include a local area network (LAN), such as a company Intranet, a metropolitan area network (MAN), or a wide area network (WAN), such as the Internet or World Wide Web. Network 500 may be a private network, a public network, or a combination thereof. Network 500 may be any type of network known in the art, including a telecommunications network, a wireless network (including Wi-Fi), and a wireline network. Network 500 may include mobile telephone networks utilizing any protocol or protocols used to communicate among mobile digital computing devices (e.g. computing device 115), such as GSM, GPRS, UMTS, AMPS, TDMA, or CDMA. In one or more non-limiting embodiments, different type of data may be transmitted via network 500 via different protocols. In further non-limiting other embodiments, user computing devices 115, may act as standalone devices or they may operate as peer machines in a peer-to-peer (or distributed) network environment.

Network 500 may further include a system of terminals, gateways, and routers. Network 500 may employ one or more cellular access technologies including but not limited to: 2nd (2G), 3rd (3G), 4th (4G), 5th (5G), LTE, Global System for Mobil communication (GSM), General Packet Radio Services (GPRS), Enhanced Data GSM Environment (EDGE), and other access technologies that may provide for broader coverage between computing devices if, for instance, they are in a remote location not accessible by other networks.

User Identification System 100 may also include one or more administrative entities such as administrative entity 120. While administrative entity 120 is depicted as a single element communicating over network 500, administrative 120 in one or more non-limiting embodiments may be distributed over network 500 in any number of physical locations. Administrative entity 120 may manipulate the software and enter commands to server 400 using any number of input devices such as a keyboard and a mouse. The input/output may be viewed on a display screen to administrative entity 120.

Server 400 may comprise a number of modules that provide various functions related to User Identification System 100 using one or more computing devices similar to user computing device 115. Modules may include a data collection module such as data collection module 405, a match test module such as match test module 410, and a notification module such as notification module 430. Modules may be in the form of software or computer programs that interact with the operating system of server 400 whereby data collected in databases such as graphical image database 450 and user profile database 460 may be processed by one or more processors within server 400 or user computing device 115 as well as in conjunction with execution of one or more other computer programs. Software instructions for implementing the detailed functionality of the modules may be written in or natively understand, including but not limited to, C, C++, Visual Basic, Java, Python, Tcl, Perl, Scheme, Ruby.

Modules may be configured to receive commands or requests from user computing device 115, server 400, and other outside connected devices over network 500. Server 400 may comprise components, subsystems, and modules to support one or more management services for User Identification System 100. For instance, match test module 410 may be configured to analyze whether images selected by user 110 that make up an authentication pattern are within certain matching parameters during the validation process.

Figure 2:
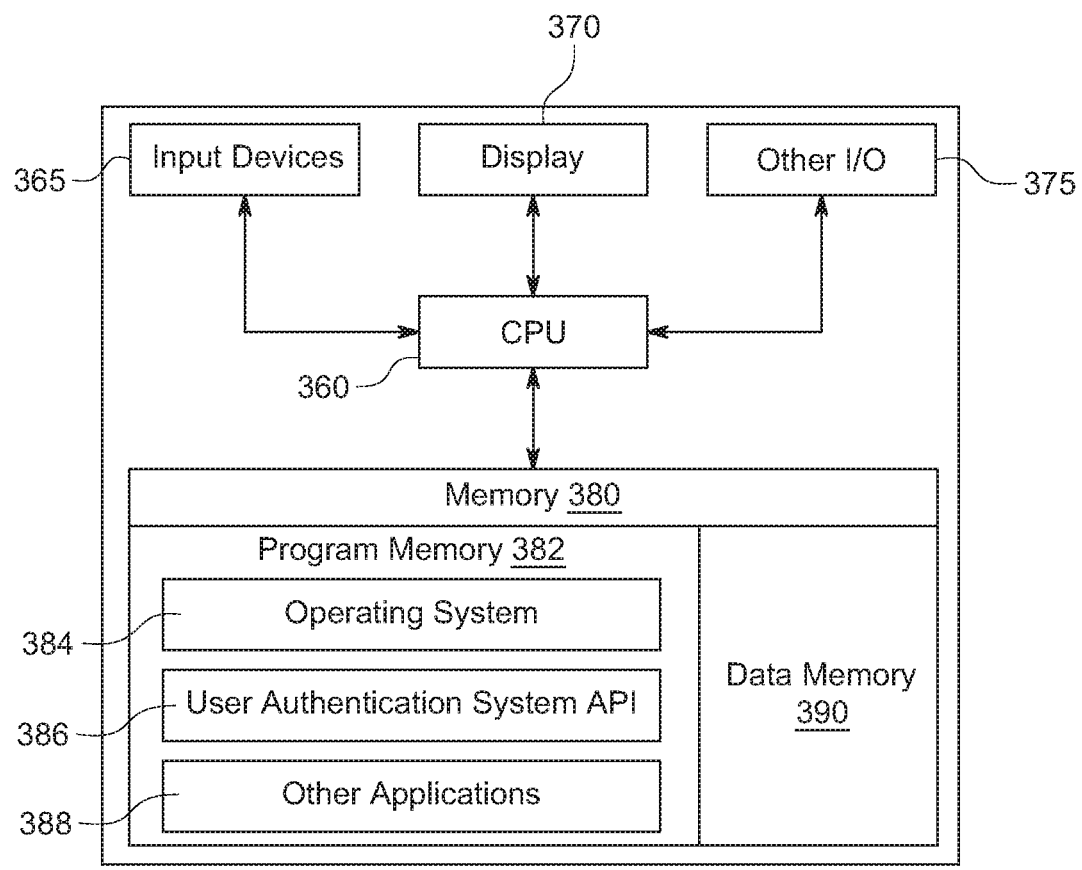
FIG. 2 depicts a schematic diagram of a computing device used in user identification system.

One or more embodiments of user computing device 115 are further detailed in FIG. 2. User computing device 115 may comprise hardware components that allow access to edit and query User Identification System 100. User computing device 115 may include one or more input devices such as input devices 365 that provide input to a CPU (processor) such as CPU 360 notifying it of actions. The actions may be mediated by a hardware controller that interprets the signals received from input device 365 and communicates the information to CPU 360 using a communication protocol. Input devices 365 may include but are not limited to a mouse, a keyboard, a touchscreen, an infrared sensor, a touchpad, a wearable input device, a camera or graphical image-based input device, a microphone, or other user input devices known by those of ordinary skill in the art.

CPU 360 may be a single processing unit or multiple processing units in a device or distributed across multiple devices. CPU 360 may be coupled to other hardware devices, such as one or more memory devices with the use of a bus, such as a PCI bus or SCSI bus. CPU 360 may communicate with a hardware controller for devices, such as for a display 370. Display 370 may be used to display text and graphics. In some examples, display 370 provides graphical and textual visual feedback to a user.

In one or more embodiments, display 370 may include an input device 365 as part of display 370, such as when input device 365 is a touchscreen or is equipped with an eye direction monitoring system. In some implementations, display 370 is separate from input device 365. Examples of display 370 include but are not limited to: an LCD display screen, an LED display screen, a projected, holographic, virtual reality display, or augmented reality display (such as a heads-up display device or a head-mounted device), wearable device electronic glasses, contact lenses capable of computer-generated sensory input and displaying data, and so on. Display 370 may also comprise a touchscreen interface operable to detect and receive touch input such as a tap or a swiping gesture. Other I/O devices such as I/O devices 375 may also be coupled to the processor, such as a network card, video card, audio card, USB, FireWire or other external device, camera, printer, speakers, CD-ROM drive, DVD drive, disk drive, or Blu-Ray device.

CPU 360 may have access to a memory such as memory 380. Memory 380 may include one or more of various hardware devices for volatile and non-volatile storage and may include both read-only and writable memory. For example, memory 380 may comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory 380 is not a propagating signal divorced from underlying hardware; a memory is thus non-transitory. Memory 380 may include program memory such as program memory 382 capable of storing programs and software, such as an operating system such as operating system 384, API such as User Identification System 100 API 386, and other computerized programs or application programs such as application programs 388. Memory 380 may also include data memory such as data memory 390 that may include database query results, configuration data, settings, user options or preferences, etc., which may be provided to program memory 382 or any element of user computing device 115.

User computing device 115 may in some embodiments be mobile computing devices such as an iPhone, Android-based phone, or Windows-based phone, however, this is non-limiting and they may be any computing device such as a tablet, television, desktop computer, laptop computer, gaming system, wearable device electronic glasses, networked router, networked switch, networked, bridge, or any computing device capable of executing instructions with sufficient processor power and memory capacity to perform operations of User Identification System 100 while in communication with network 500. User computing device 115 may have location tracking capabilities such as Mobile Location Determination System (MLDS) or Global Positioning System (GPS) whereby they may include one or more satellite radios capable of determining the geographical location of computing device 115.

Figure 3:
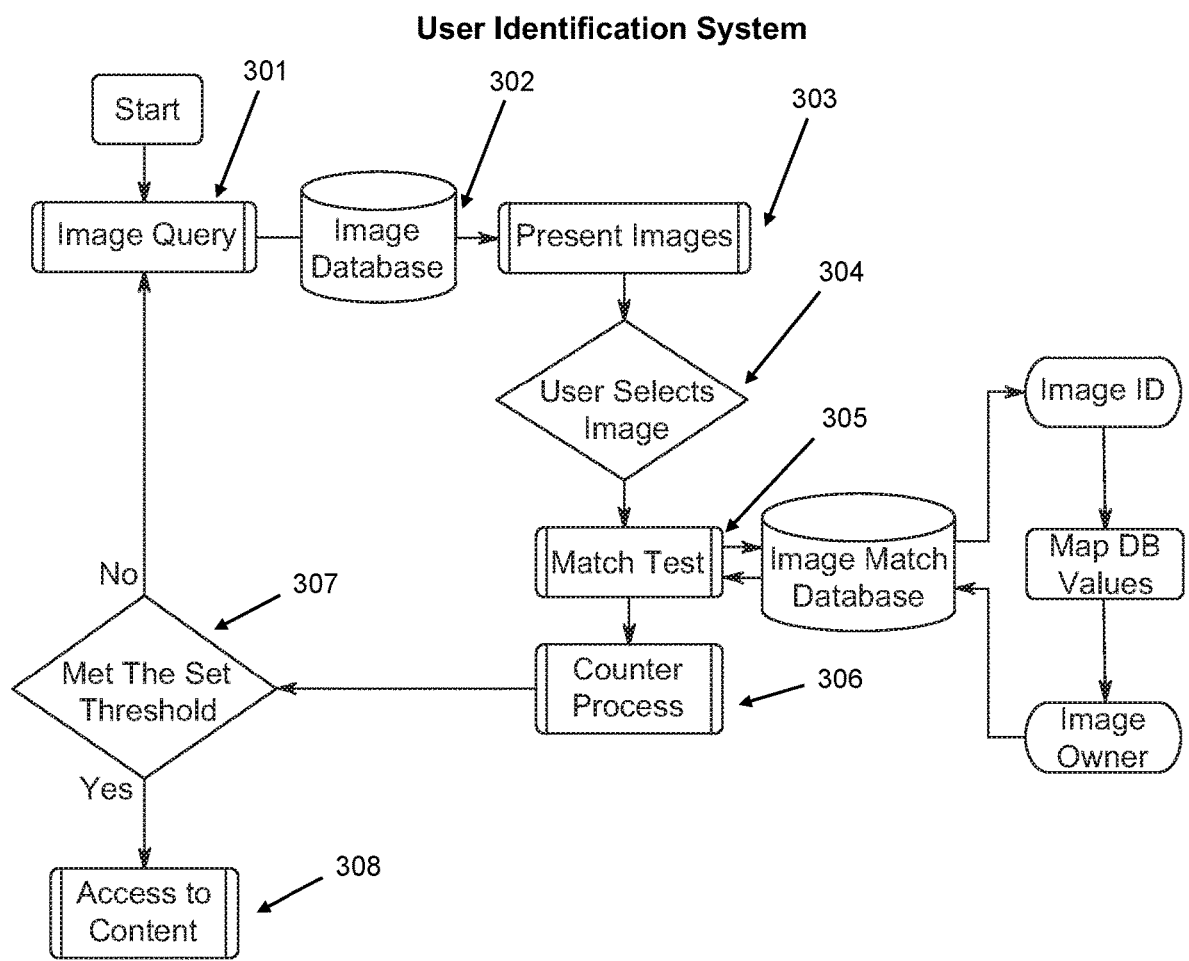
FIG. 3 illustrates a simplified flowchart diagram in connection with the present invention directed to a user identification system.

FIG. 3 illustrates an exemplary method depicting a flow diagram showing an embodiment of an exemplary method for implementing User Identification System 100 wherein one or more components included in FIG. 1, such as, without limitation, user computing devices 115, server 400, and network 500. User 110 may initially register to become a registered user associated with User Identification System 100 or any platforms which User Identification System 100 has been integrated with User Identification System API 386. Platforms may be downloadable and installable on user computing devices through an API. In one or more non-limiting embodiments, User Identification System 100 or platform may be preinstalled on user computing devices 115 by the manufacturer or designer. Further, User Identification System 100 may be implemented using a web browser via a browser extension or plugin.

Upon initially signing up with User Identification System 100, user 110 may initiate a creation session wherein user 110 may be prompted to provide an email address or other identifying sources such as a telephone number or unique ID wherein the unique ID is a series of alphanumeric characters of which user 110 wants to be identified. After entering an email address, user 110 may be presented with a text window interface or other screen whereby user 110 may enter their name, username, password, phone number and address.

In further embodiments, user 110 may establish one or more different profiles whereby the different profiles may individually be associated with specific roles of user 110. For instance, if a user 110 is acting as a business entity and as an individual person, this is non-limiting and all information pertaining to both may be accessible as well.

User 110 may authorize User Identification System 100 to access information or other data from external sources operated by user 110 such as their own enterprise network having a collection of graphical images whereby data collection module 405 is configured to collect information from the enterprise network and integrate the information into User Identification System 100. In one or more non-limiting embodiments, user 110 may be required to provide credentials to the third-party service provider to allow access by User Identification System 100. User 110 may also authorize social network access whereby when a social network service is linked to User Identification System 100, access may be granted to various accounts of user 110 and importing of data from those accounts may occur such as to import one or more social media graphical images. If user 110 authorizes access, data collection module 405 collects or otherwise accesses graphical images and stores the information in graphical image database 450 with an associated user 110 identifier.

Upon successful authentication of user 110, a page may be presented to user 110 whereby user 110 will select an authentication pattern to access content on User Identification System 100 at step 301. User 110 has the ability to upload graphical images through user interface 112 to use in an authentication pattern wherein the graphical images are then collected by data collection module 405, whereby data collection module 405 stores graphical images on graphical image database 450 with corresponding identifiers to the respective user 110 at step 302. Graphical images may be any number of graphical image formats such as jpg, gif, raw or may be selected from multimedia files such as mpg, avi, .mov, etc. any computer definable graphical image format may be utilized for processing by User Identification System 100. In other non-limiting embodiments, graphical images may instead be any form of content such as audio, video, music, and other forms of content.

User interface 112 may allow user 110 to upload graphical images directly from a camera on user computing device 115 for authentication pattern. In one or more non-limiting embodiments, user 110 may search for graphical images whereby user interface 112 may include one or more selectable buttons to add graphical images. Graphical images may also come from an existing database stored on graphical image database 450 of server 400 or a third-party database that server 400 is in communication with, whereby server 400 may receive results from third-party databases such as existing databases already catalogued and indexed or sorted on platforms, such as Getty Images or Facebook already having a wide array of graphical images. Graphical images may be collected via a third-party camera and/or photos application wherein graphical images may be from application or source such as Snapchat, Facebook, Instagram, Amazon, eBay, Discord, Reddit, Twitter, etc. If a graphical image already exists publicly online, data collection module 405 may utilize any known network search methods, to initiate a content search or query for content. In one or more non-limiting embodiments, a crowd-source platform may be utilized wherein third-parties may search for content.

Depending on the platform, an authentication pattern may be comprised of a certain number of designated graphical images in the collection while in some embodiments the authentication pattern may be sequence specific wherein the authentication pattern may require the designated graphical images to be selected in a specific order in the collection. User interface 112 may present information to user 110 of the required number of designated graphical images needed for an authentication pattern as well as if the designated graphical images are needed to be selected in specific order in the collection.

After selecting a "Graphical Image Button", user interface 112 may display a screen allowing user 110 to upload another graphical image. After each graphical image has been selected by user 110, it is then determined if user 110 has selected the predetermined minimum number of graphical images. If no, user 110 may continue to select graphical images. If yes, user 110 may successfully complete the authentication pattern. The authentication pattern is then uploaded to user profile database 460.

The basis for the selection of graphical images by user 110 may be something that can be easily remembered by that specific user 110 or something of interest, such as but not limited to sports, music, or entertainment. For instance, user 110 may upload or select from an existing set of graphical images that relate to an abstract idea, such as French fries, Starry Night, and Van Gogh equivalent to or otherwise represents France, Seinfeld equivalent to or otherwise represents New York, or a Flying Saucer and Space Needle equivalent to or otherwise represents Seattle. User 110 may upload or select from an existing set of graphical images that can be represented by a series of abstract ideas. For example, a sailboat may be represented by a series of abstract ideas including graphical images of a lead for the keel, a compass Rose, a lead line, a plank of wood for the hull, a propeller, a roll of fabric for a sail, and a coil of rope.

User 110 may upload or select from an existing set of pictures or graphical images that relate to a certain theme, such as "Wizard of Oz" where the graphical images selected or chosen may include a tornado, a corn field, a bail of straw, a human heart, slippers, an armored suit, a small dog, a monkey, or a witch's hat. A picture of scrambled eggs can be selected for random presentation. A picture of a domino may also be used to represent a sequential series. Selections such as these prevent an artificial intelligence entity or platform from deciphering a user's authentication pattern because they lack the cognitive association to recognize suitable graphical images to build the solution to the riddle.

User 110 may upload or select from an existing set of pictures graphical images that create a story from the user's own imagination wherein the graphical images may represent components of a story comprising a location, a setting, a protagonist, a topic, a series of stages, and an ending, whereby the group can still be recognized even if the sequence has been shuffled. For example, a "Mutiny on the Bounty" may be represented by a picture of a ship's deck with sailors and muskets aimed, breadfruits are loaded onto a ship represented by a picture of breadfruit, a ship burns in the harbor represented by a picture of a ship burning, a ship sets sail from London represented by a picture of old London harbor, an island is reached represented by a picture of Pitcairn Island, and a few sailors are set adrift in a small boat represented by a picture of men in a longboat such as Captain Bligh.

User 110 may also add more graphical images than are required to create an authentication pattern. User interface 112 may display a screen presenting the graphical images that have been selected during the creation process or after the process to user 110 whereby user may add, remove, or rearrange the sequence of the graphical images to create or modify the authentication pattern.

In some embodiments user identification system 100 may have a conversion module that takes a user's 110 input of text or numbers and creates an image with those values embedded within the image. This may be an existing image either from user 110 or from an external image collection database whereby conversion module applies the text of user 110 as an overlay and then reduces the combination to a single layer. For example a user 110 may input "Seattle" and the conversion Module would provide user 110 with a number of selected images suitable to represent Seattle. User 110 may then select a landmark such as the Space Needle as a preferred image. Conversion module may the generate an image containing both the image of the Space Needle and the term Seattle. In or more non-limiting embodiments, the text may be fuzzy or distorted to make it more secure from machine-reading attacks.

Numbers, terms, and other forms of text or indicia may be embedded into an image hereby user 110 may understand the text while preventing the text from being machine readable. This provides another mode of difficulty for the hackers to crack. An example may be that there is an image of five apples to represent the number "5" or this may be represented by a starfish with 5 limbs. Another example may be that there I an image of the number "4" or the roman numeral "IV" or an image of a square. By moving from text to an image, the presentation and digital transfer does not expose the meaning or value of the element within the logic process.

Upon successful selection of the required number of graphical images, User identification system 100 may present to user 110 through user interface 112 the ability to finish completing the creation of the authentication pattern.

When user 110 initiates an authentication session, user 110 may be prompted to enter their existing unique ID, through user interface 112, to initiate an authentication session. Once an existing User ID has been entered by user 110. A page or pop-up window may be generated by data collection module 405 using graphical images databases 450 that may be visible to user 110 including graphical images that were uploaded or selected by user 110 during the initiation session when selecting an authentication pattern at step 303.

The page or pop-up window may comprise a dynamic graphical grid having one or more graphical images represented by cells wherein the graphical images are collected by data collection module 405 and stored in graphical image database 450.

Figure 4:
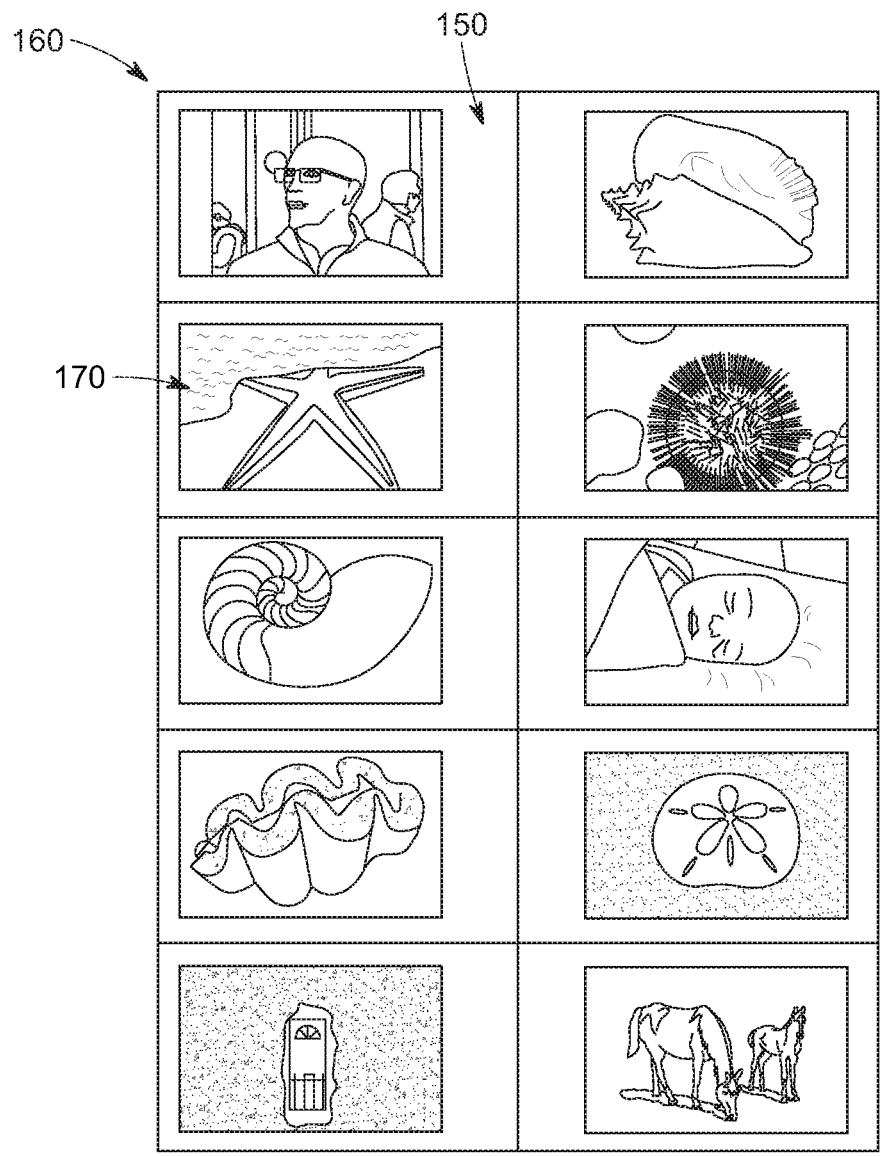
FIG. 4 illustrates a dynamic graphical authentication grid that includes various graphical images corresponding to a Photo Pass.

An embodiment of a grid of graphical images that appears to user 110 is illustrated in FIG. 4. Cells such as cells 150 of a grid such as grid 160 may display a variety of graphical images such as graphical images 170. The cells are oriented in a predetermined arrangement such as a 2×5 grid however this is non-limiting and the grid arrangement may be of any size, shape, or orientation. Cells 150 of grid 160 may display graphical images collected form graphical image database 450 and may be displayed to user 110 according to a predetermined arrangement or pattern. The location of the graphical images in grid 160 may be randomized. The specific graphical image for each grid 160 may be chosen randomly from graphical image database 450 such as having a grid 160 with no graphical images 170 that are a part of user 110 photo pass or authentication pattern. In other non-limiting embodiments, each or all of these properties are not required to be dynamic and may be static instead during or in between authentication processes.

Designated graphical images may be selected by user 110 as a photo pass or authentication pattern during the particular authentication process. User 110 may locate any designated graphical images displayed within the predetermined arrangement that are a part of the user's 110 authentication pattern created during the creation session. In order to enhance security, the designated graphical images may be randomly displayed on the screen.

The page or pop-up window may comprise a dynamic graphical grid 160 having no graphical images that are designated images of user's 110 authentication pattern. When this screen is presented, user 110 may select any image and proceed through multiple pages comprising dynamic graphical grids 160 by selecting the graphical image with a mouse and keyboard or through the touch-screen until they recognize a graphical image that is a component of user's 110 authentication pattern.

User 110 may proceed to select the graphical image on a grid 160 according to their respective authentication pattern by selecting the graphical image with a mouse and keyboard or through the touchscreen at step 304. Once user 110 has selected a graphical image the specific graphical image selected by user 110 may be processed by match test module 410 for validation to determine if the selected first image is equivalent to the first graphical image in the authentication pattern of user 110 created during the enrollment process at step 305.

Figure 5:
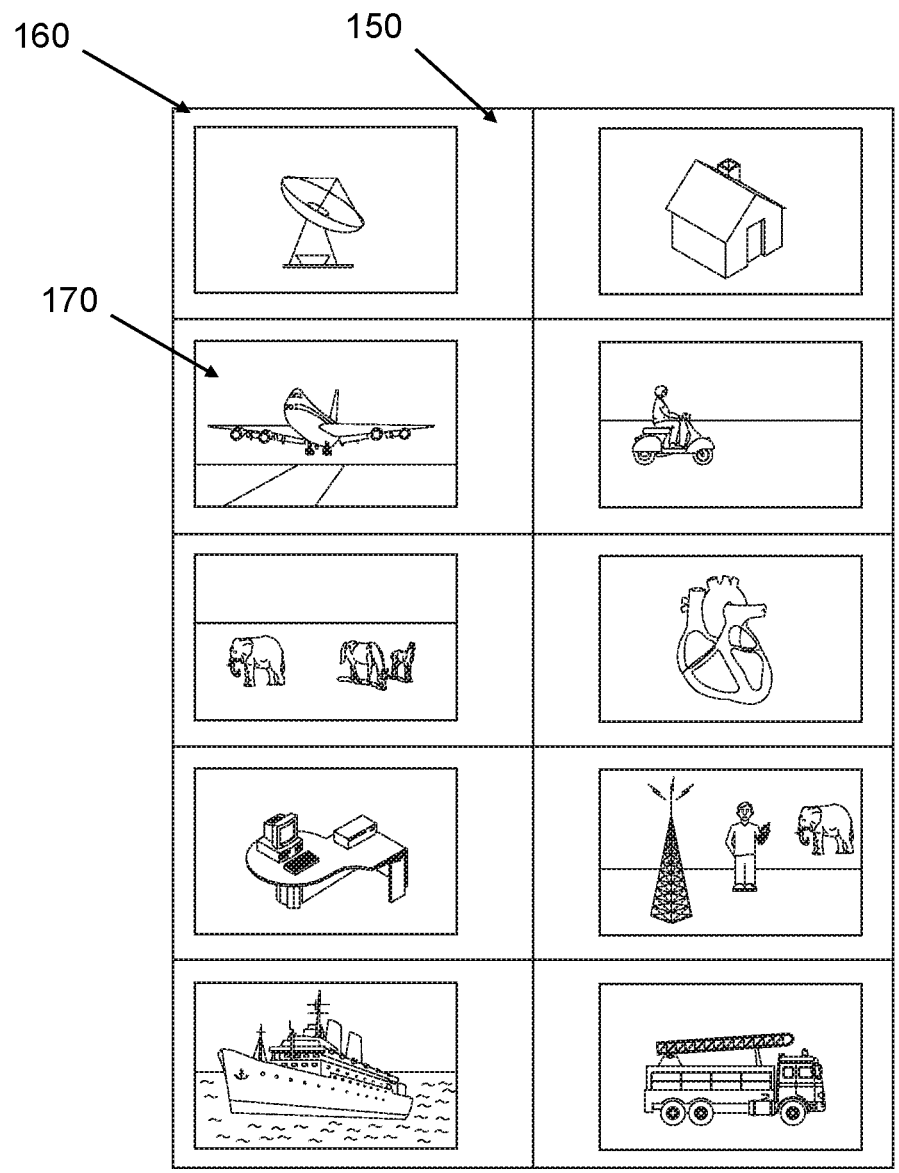
FIG. 5 illustrates an additional dynamic graphical authentication grid that includes various graphical images corresponding to a Photo Pass.

If the specific graphic image is validated at step 306, the first step in the authentication process may conclude successfully, and user 110 may be presented by data collection module 405 another screen with dynamic graphical grids 160 having the second image in the authentication pattern or pages without the second image in the authentication pattern whereby user 110 may select random images until they are presented with a page having the second image in the authentication pattern as illustrated in FIG. 5. In some embodiments, user 110 may be required to select a certain graphical image such as the top left on pages that are presented before the page with the second image in the authentication pattern. If the specific selection of a graphical image is not valid, data collection module 405 may present one or more pages of dynamic graphical grids 160 to user 110 to start over the process. Some of the pages may have one or more graphical images in the authentication pattern while some may not. If the incorrect graphical image is selected, user 110 would not know because there isn't any information displayed that signifies a failed attempt by user 110.

In some embodiments User Identification System 100 may implement a process to delay and thereby defeat brute force attack wherein after each failed attempt, user authentication system 100 wait for an increased number of seconds, such as but not limited to a rate of T*A wherein T is the amount of the time and A is the number of attempts. For example, if T=5, then after 1 attempt, user authentication system 100 may wait 5 seconds to display the next page, at the second failed attempt, it waits for 5*2=10 seconds to display the next page. The time may also be based on a rate calculated by addition or exponentials. This is designed to defeat hackers by creating the illusion that the system is slowing down and not worth the trouble of trying to guess an authentication pattern. This process may be initiated after the first time a user 110 does not recognize the first graphical image in the authentication pattern and selects a wrong image on the page, or when user 110 has correctly selected the first graphical image in the authentication pattern correctly but subsequently selects a wrong graphical image when the second graphical image is present on a page. The process may be initiated at any other time or after any correct number or incorrect number of selections.

User 110 may proceed to select another graphical image on a grid 160 according to their respective authentication pattern by selecting the graphical image with a mouse and keyboard or through the touchscreen. The second and latter graphical images in the authentication may in some embodiments be displayed to user 110 once user 110 has correctly selected the first graphical image in the authentication pattern. In other non-limiting embodiments, the second and latter graphical images may be presented at any time during the authentication process. In some embodiments, the second and latter graphical images in the authentication pattern may be displayed a predetermined percentage of the time after user 110 has correctly selected the first graphical image in the authentication pattern. Once user 110 has selected the second graphical image, the second specific graphical image selected by user 110 may be processed by match test module 410 for validation.

If the second specific graphic image is validated, the second step in the authentication process may conclude successfully, and data collection module 405 may present user 110 with another screen containing dynamic graphical grids 160 having the third image in the authentication pattern. If the specific selection of a graphical image is not validated, data collection module 405 may present another page of dynamic graphical grids 160 with the first graphical image in the authentication pattern or without a graphical image in the authentication pattern of user 110 whereby user 110 may select a graphical image on each page until the first graphical image in the authentication pattern is presented.

This pattern may continue from step 301 until the authentication pattern has been completed or a set number of correct images has been validated by match test module 410 at step 307, wherein user 110 is able to access content for their respective User ID on the platform at step 308.

In one or more non-limiting embodiments, user 110 may not be required to select graphical images in the authentication pattern in a specific order and may only need to select a graphical image that is in user's 110 authentication pattern. In one or more non-limiting embodiments, user 110 may only be required to reach a predetermined threshold level to access content on a platform. A "score" of 80% of the graphical images may be used as the trigger wherein user 110 selected eight of ten correct images, for example.

In one or more non-limiting embodiments, user's 110 selections may be assigned points values whereby once user 110 has selected a certain amount of images that are in the authentication pattern they may be granted to access content on a platform. For instance a positive point value such as but not limited to +1 may be given when an image selected by the user is related to the authentication pattern. A negative point value such as but not limited to −5 may be given when an image selected by the user is not related to the authentication pattern. An example may be where user 110 is granted to access content on a platform if they acquire a current value of 5. If user 110 began the process by selecting two subsequent images not related to the authentication pattern, user 110 would have a current value of −10. User 110 would then need to select 15 subsequent images related to the authentication pattern to be granted access to a platform.

A timed lockout of a predetermined number of minutes may be implemented after a predetermined number of attempts at inputting an authentication pattern to eliminate the threat from brute force attacks by hackers or artificial intelligence solving algorithms. In other non-limiting embodiments, a timer may be set to prevent or slowdown the next attempt by user 110 to input an authentication pattern during the authentication session. With each failure, the timing may be increased by addition, multiplication, or exponential power.

In further non-limiting embodiments, designated images, authentication patterns, or collections may be shuffled at each stage or level. Also, each time a user 110 initiates a session, they may be able to use a different authentication sequence. User Identification System 100 may also allow user 110 to input a User ID and traditional password where the image authentication phase works in conjunction with the traditional phase.

In some embodiments, User Identification System 100 may determine whether user 110 is within a predetermined distance of a geographic area selected by user 110, within a certain distance of the last time user 110 successfully was verified, or a selected area by user 110, system 100, or a third party. If user 110 is not within the predefined distance of user 110, data collection module 405 may never present to user a graphical image in the authentication sequence or never allow verification.

In some embodiments, User Identification System 100 may determine whether user 110 is within a predetermined time period selected by user 110, within a certain period of the day, month, or year, or after a predetermined amount of time when user 110 successfully was verified. If user 110 is not within the user's 110 predefined time period, data collection module 405 may never present to user a graphical image in the authentication sequence or never allow verification.

Figure 6:
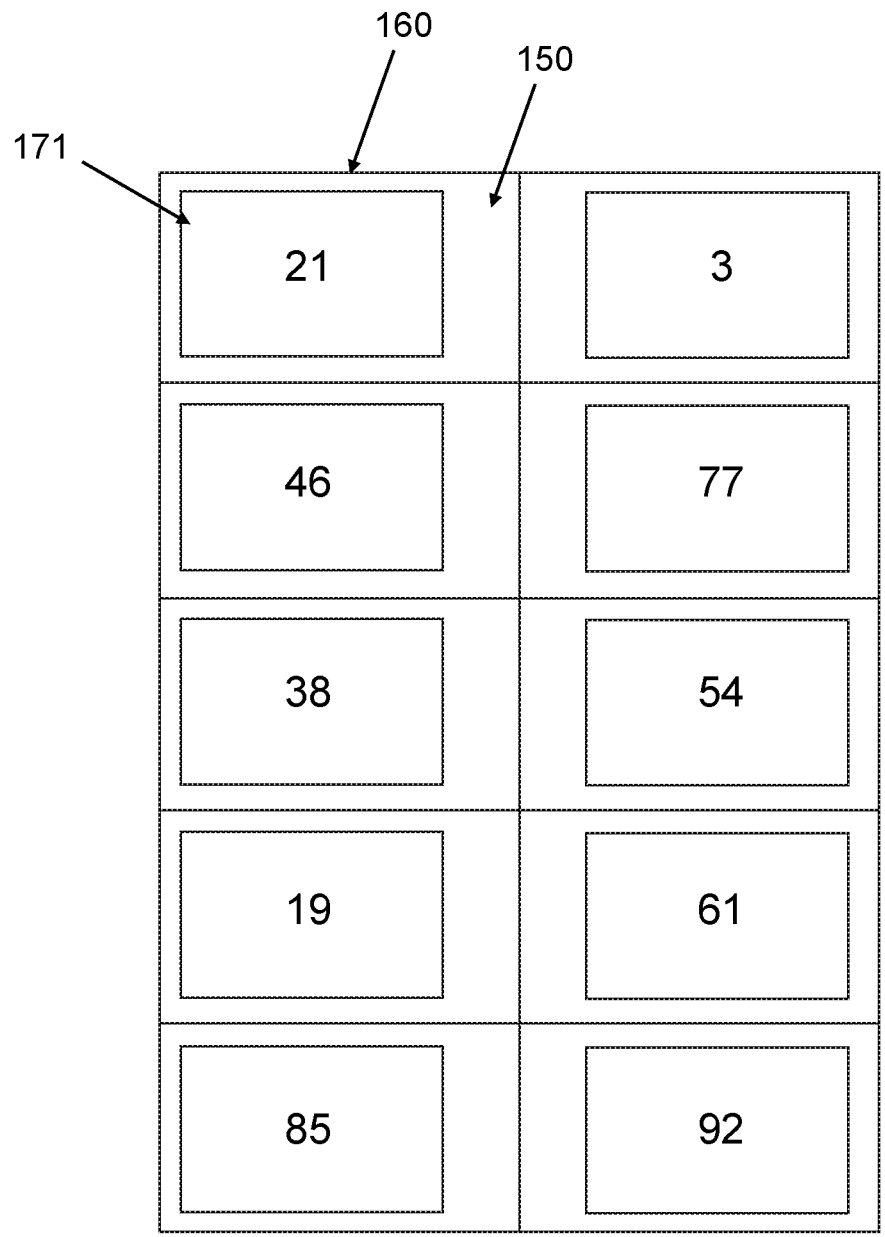
FIG. 6 illustrates an additional dynamic graphical authentication grid that includes various numbers corresponding to a Photo Pass.

In one or more non-limiting embodiments, a grid 160 may be presented to user 110 wherein grid 160 may correspond to different numerals, such as numbers 171 between one (1) through one hundred (100) as illustrated in FIG. 6. User 110 may then select an authentication pattern in the form of a number wherein user 110 may select various numerals on grid 160 that may be calculated to be equivalent or otherwise correspond to the authentication pattern number. For example, authentication pattern number may be correctly chosen by selecting numerals 171 that the authentication pattern number is divisible. The numerals may be applied to any location on a grid 160 or any different feasible combination or arrangement. This prevents other users from verification in that they would not be able to detect if the authentication pattern is based on the selection of graphical images or numeral patterns. The user selection pattern could be 3 even numbers followed by three odd numbers or alternating between even numbers and prime numbers or numbers that are divisible by 3.

Figure 7:
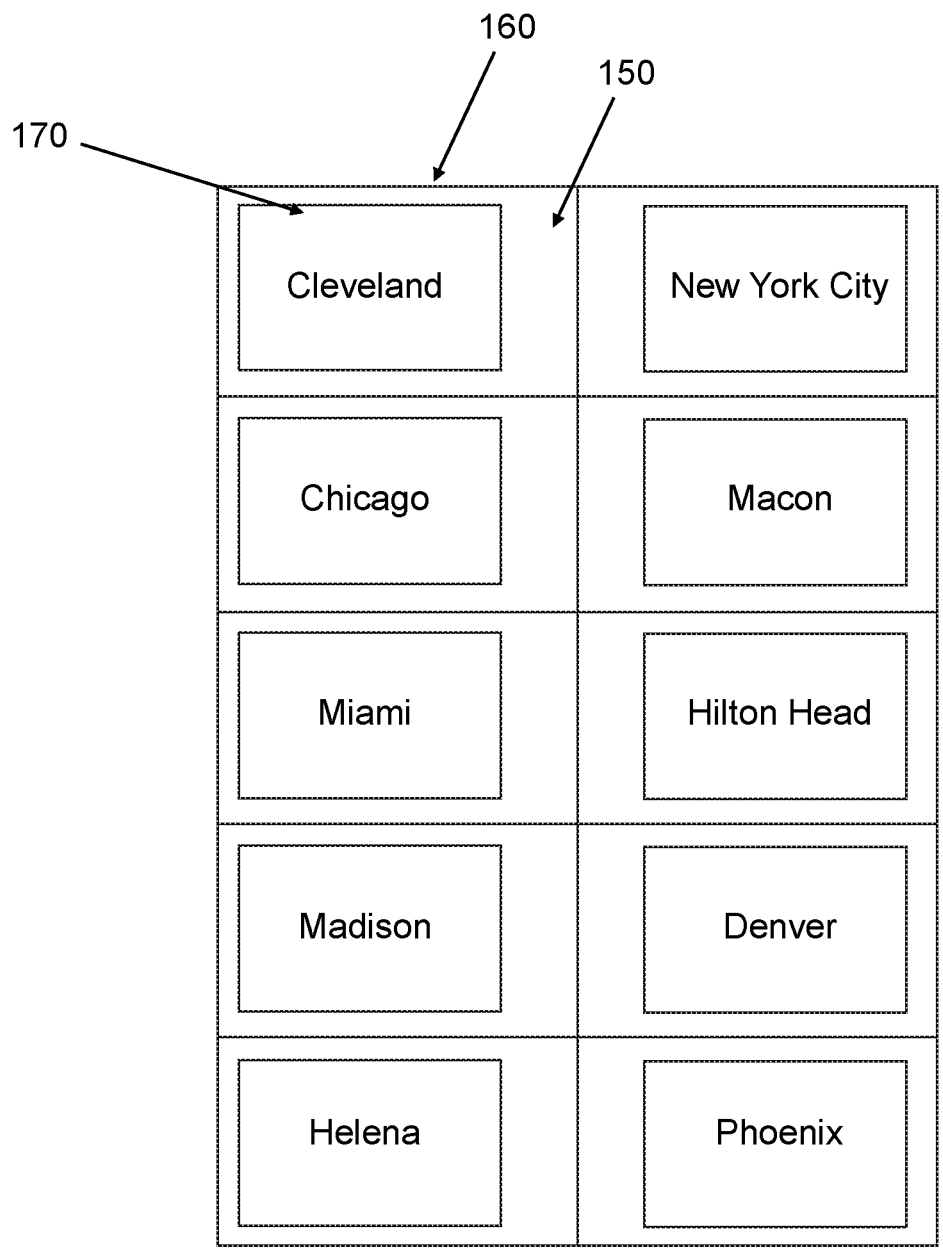
FIG. 7 illustrates an additional dynamic graphical authentication grid that includes various cities corresponding to a Photo Pass.

In one or more non-limiting embodiments, a grid 160 may be presented to user 110 wherein grid 160 may correspond to different cities, such as cities throughout the United States as illustrated in FIG. 7. During the authentication process, data collection module 405 would present to user 110 cities in a similar manner to the graphical images, but instead of selecting graphical images, user 110 would select cities that comprise the authentication pattern. For instance authentication pattern may be made up of cities in Florida (Miami).

Figure 8:
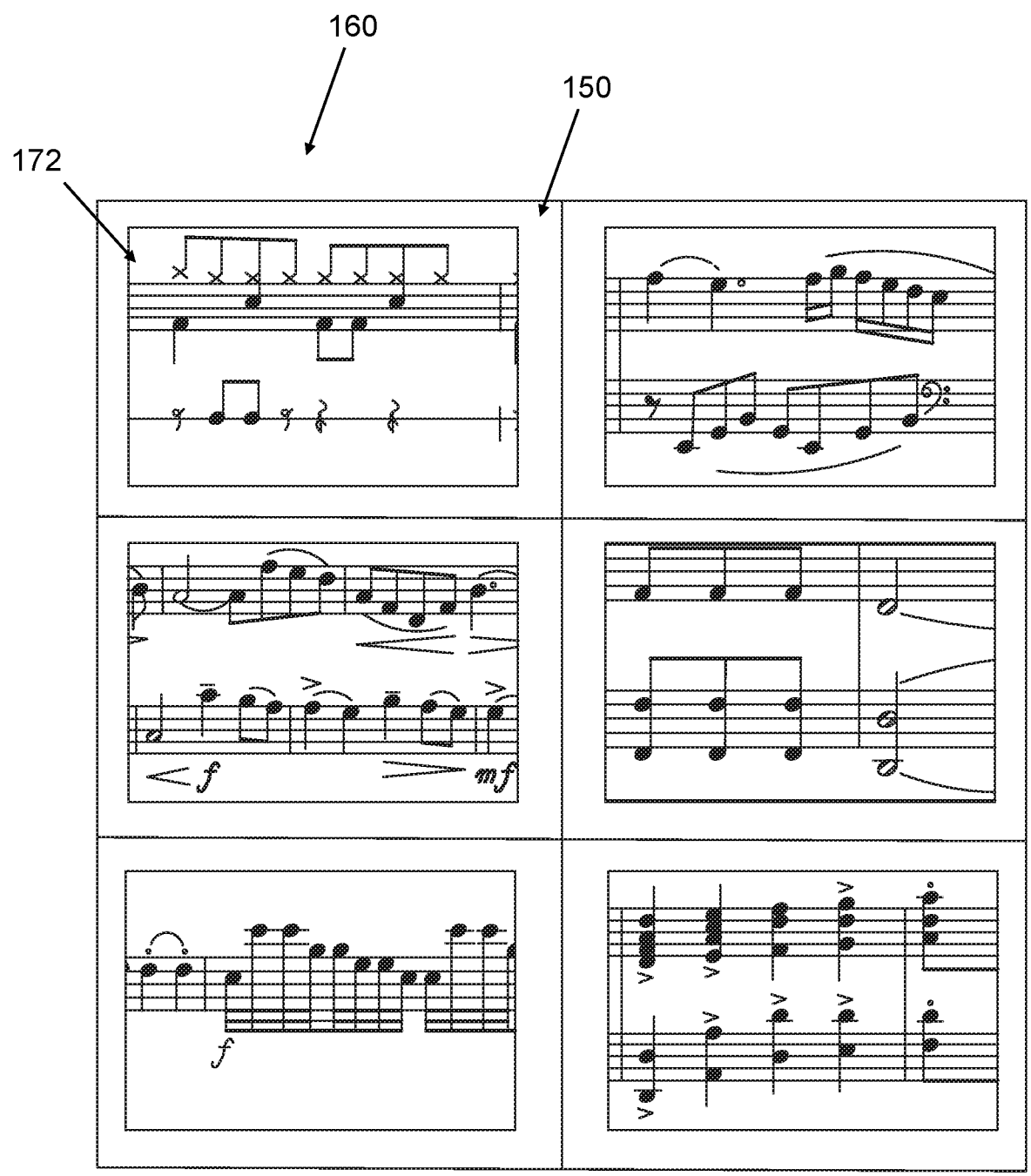
FIG. 8 illustrates an additional dynamic graphical authentication grid that includes various musical notes corresponding to a Photo Pass.

In one or more non-limiting embodiments, a grid 160 may instead be comprised of musical notes 172 or any other object instead of a graphical image as illustrated in FIG. 8. In the enrollment process, user 110 may select an authentication pattern comprised of musical notes of an existing musical score or a musical score created by user 110. During the authentication process, data collection module 405 would present to user 110 musical notes in a similar manner to the graphical images, but instead of selecting graphical images, user 110 would select musical notes that comprise the authentication pattern.

In one or more non-limiting embodiments, a grid 160 may instead be comprised of an electrical circuit system. In the enrollment process, user 110 may select an authentication pattern comprised of a different circuitry. During the authentication process, data collection module 405 would present to user 110 circuits in a similar manner to the graphical images, but instead of selecting graphical images, user 110 would select circuits that comprise the authentication pattern.

In one or more non-limiting embodiments, a grid with a predetermined amount of images (20, 30, etc.) may be presented. Each image may have a checkbox or other selectable icon to select and retain this selection with a visual factor to indicate that the element has been selected. To authenticate, user 100 would need to select all of the correct elements and not one of the wrong decoys presented in the grid. This may be presented on a single screen with a single submit button, which may be selected after selecting the correct elements. With each authentication session, the arrangement of the elements may be randomized. The elements that are presented may be a subset of countless images or terms (both correct and incorrect) thereby providing unique presentations for each and every session whereby it almost never repeats.

In one or more non-limiting embodiments, instead of a grid 160 being presented to user 110, user 110 may utilize various touchscreen gestures such as "drag and drop" or pattern creation wherein user 110 "drags" their finger between graphical images to create a pattern on the display to add another layer of security wherein touch gestures may operate to match different corresponding images to one another. In this example during the enrollment process, user 110 may select various graphical images and connect them to other graphical images. The authentication process is similar to selection of graphical images, however, user 110 now "drag and drops" graphical images onto connected graphical images or user 110 drags their finger in a pattern on the display In one or more non-limiting embodiments, instead of a grid 160 being presented to user 110, user 110 may utilize various touch screen gestures to add another layer of security wherein touch gestures may operate as a confirmation or denial of a graphical image 170 being a part of the authentication pattern as illustrated in FIG. 9.

User 110 may navigate through the set of presented graphical images by swiping through a stack of graphical images 170. Users may express approval of a presented graphical image 170 being a part of the authentication pattern by performing a touch gesture such as a right swipe gesture or express denial of the presented graphical image 170 being a part of the authentication pattern by performing a left swipe gesture. Other suitable gestures or manners of interacting with user interface 112 may be used, such as tapping or selecting portions of the screen. For example, User 110 may upload or select from an existing set of pictures graphical images 170 that closely relate to their preferences of food. So, if user 110 does not like cabbage but loves broccoli, they may choose a graphical image of broccoli to be a part of their specific authentication sequence and express denial to a presented graphical image of cabbage.

Figure 9:
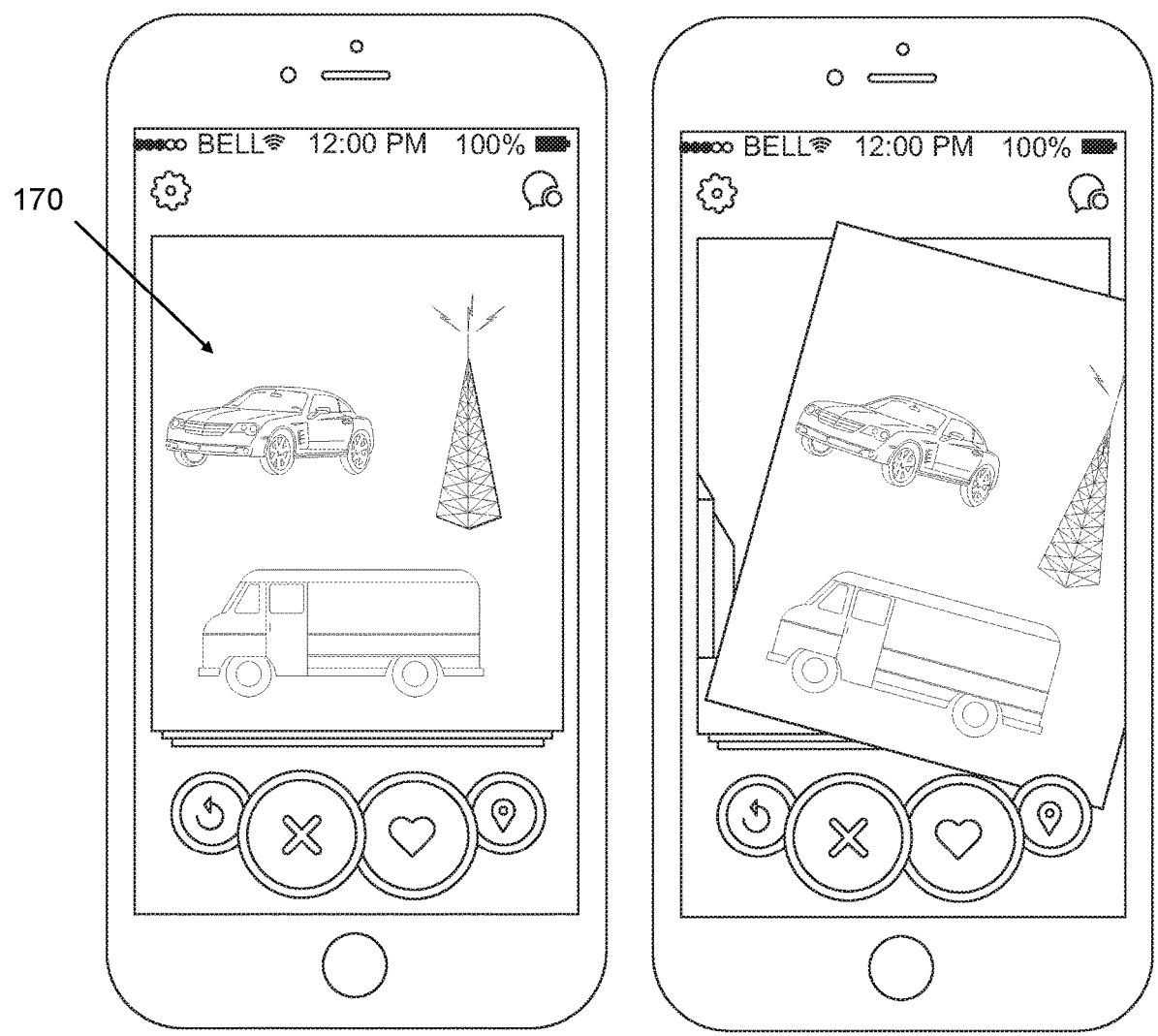
FIG. 9 illustrates a gesture interface with a stack of graphical images corresponding to a Photo Pass.
Figure 10:
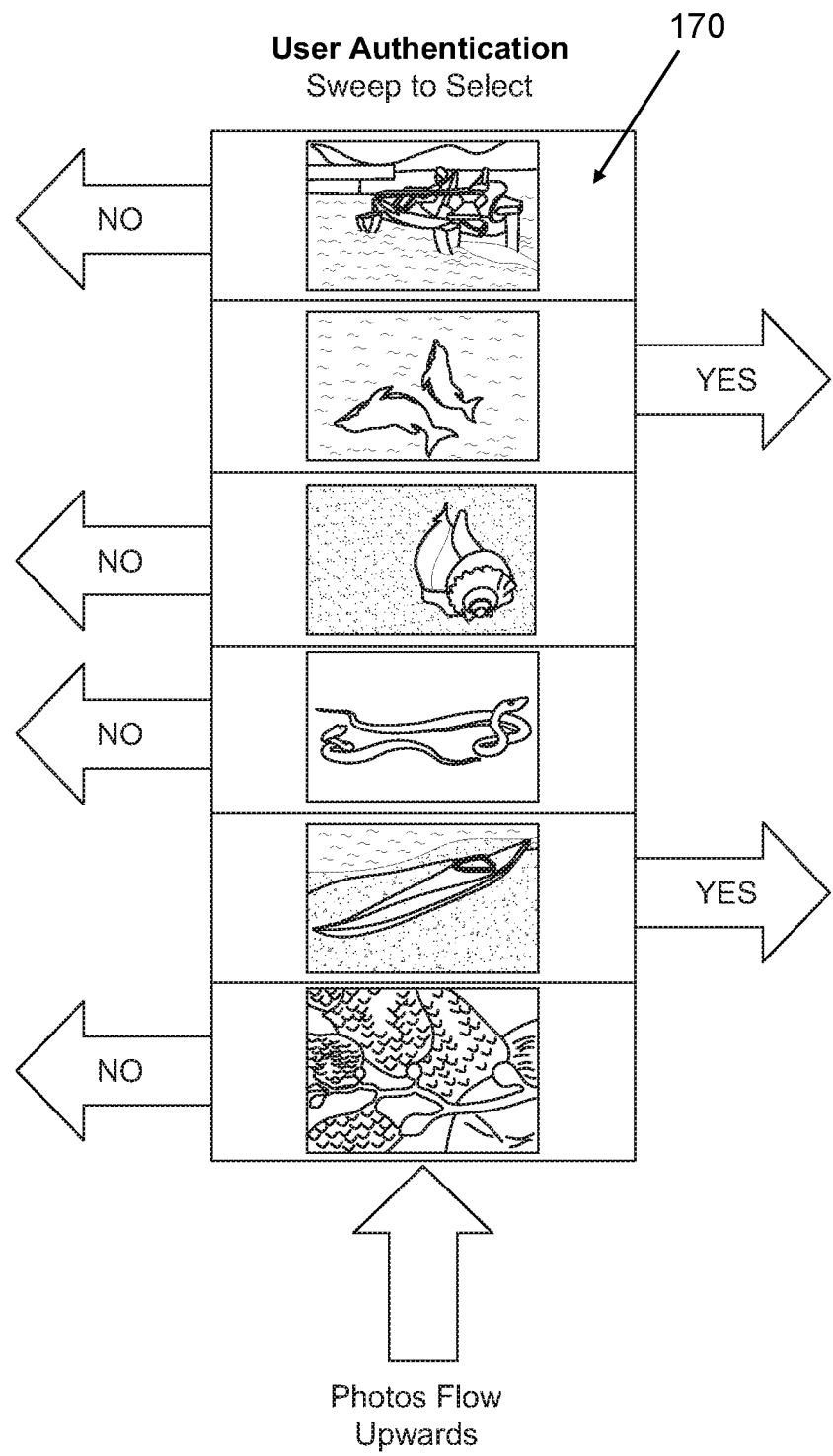
FIG. 10 illustrates a gesture interface with a tower stack of graphical images corresponding to a Photo Pass.

In a similar manner to FIG. 9, FIG. 10 illustrates a stack or scaling tower of graphical images 170 presented to user 110 whereby user 110 may utilize various touchscreen gestures to operate as a confirmation or denial of a graphical image 170 being a part of the authentication pattern. Once user 110 has swiped on a specific graphical images 170, graphical images 170 may move up the tower filling into the spot of the previous graphical images 170 that was swiped upon whereby a certain number of graphical images 170 appear on screen.

In one or more non-limiting embodiments, an image map of an image may be created whereby the image is divided into regions called hotspots. The authentication pattern of the user may be made of these hotspots such that depending on the location where the user selects the image may determine if the user has selected the correct hotspot in the authentication pattern or the incorrect hotspot. In some embodiments user 110 may select hot spots irrelated to any specific image whereby instead of picking select regions on an image based on the image user 110 would be picking the regions regardless of what image is presented. For instance the authentication pattern may be four corners (top left, top right, bottom left, bottom right) whereby user 110 would sequentially select these spots with one selection on each image. If someone was attempting to steal user's 110 authentication pattern they would not think user 110 is picking specific parts of an image and not realizing the image in fact does not matter to the authentication pattern.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:
1. A system for creating one or more authentication sequences; the system comprising:
    a computing system having a non-transitory computer-readable medium comprising code, wherein instructions are executed by the computing system to perform:

maintaining a database, wherein a platform is in communication with the database, wherein the database stores data associated with a user collected from a user computing device;

receiving, one or more images from the user computing device for an authentication sequence, the authentication sequence comprising one or more designated images;

associating the one or more designated images associated with the user computing device wherein the one or more designated images are stored with an identifier for the user in the database;

generating one or more dynamic collections;

creating an assortment of images on the one or more dynamic collections, the assortment of images comprising the one or more designated images from the user;

presenting a first dynamic collection to the user displayed on the user computing device;

obtaining a first image selected by the user on the user computing device;

comparing, by a processor the first image selected by the user on the user computing device in the first dynamic collection to the authentication sequence associated with the user to determine if the selected first image is related to the authentication sequence associated with the user;

presenting one or more additional dynamic collections to the user displayed on the user computing device;

comparing, by the processor, an additional image selected by the user in each of the one or more additional dynamic collections to the authentication sequence associated with the user to determine if the selected additional image is related to the authentication sequence associated with the user;

delaying the presentation of the one or more additional dynamic collections in response to a received selection from the user computing device that was not in the authentication sequence;

dividing the one or more designated images into hot zone regions, wherein the authentication sequence includes the hot zone regions such that depending on a location where the user selects an image of the dynamic collection determines if the user has selected a correct hotspot in the authentication sequence or an incorrect hotspot; and determining if access to the platform should be granted when a match from the comparison verifies the authenticity of a user's identity, wherein the system does not transmit a notification that any of the selected images in the first dynamic collection or the one or more additional dynamic collections were related to the authentication sequence or that any of the selected images in the first dynamic collection or the one or more additional dynamic collections were not related to the authentication sequence such that the user computing device does not present the user with any information that the user has initiated any steps in selecting a proper authentication image sequence until being granted access to the platform.

2. The system of claim 1, wherein instructions are executed by the user computing device to further perform:
providing access for the user computing device to the platform if a predetermined amount of the selected images by the user are related to the authentication sequence.

3. The system of claim 2, wherein instructions are executed by the user computing device to further perform:
providing access for the user computing device to the platform if the selected images of the authentication sequence were selected in a specific order by the user.

4. The system of claim 1, wherein instructions are executed by the user computing device to further perform:
delaying the presentation of the one or more additional dynamic collections in response to a received image selection from the user computing device that are not in the authentication sequence to create the illusion that the system is slowing down.

5. The system of claim 4, wherein
a timing for the delaying of the presentation of the one or more additional dynamic collections is increased by addition, multiplication, or exponential power.

6. The system of claim 1, wherein instructions are executed by the user computing device to further perform:
determining if the user is accessing the system on the user computing device within a predetermined time period or within a predetermined distance of a geographic area as selected by the user; and
generating, in response to the user not being within the predetermined time period or within the predetermined distance of the geographic area, a dynamic collection without designated images on the user computing device such that the user is incapable of being granted access to the platform.

7. The system of claim 6, wherein instructions are executed by the user computing device to further perform:
converting input of the user from the user computing device to create an image with the values of the input embedded within the image, wherein the input is presented with text or numbers.

8. The system of claim 1, wherein the one or more designated images are uploaded by the user.

9. The system of claim 1, wherein instructions are executed by the user computing device to further perform:
assigning a positive point value for an image selected by the user that is related to the authentication sequence;
assigning a negative point value for an image selected by the user that is not related to the authentication sequence wherein an absolute value of the negative point value is greater than an absolute value of the positive value;
determining if a current point value is above a predetermined number; and
providing access if the current point value is above the predetermined number.

10. A system for creating one or more authentication sequences, wherein the system, during the verification process of the one or more created authentication sequences, does not present the user with any information that the user has initiated or advanced any steps in selecting a proper authentication sequence until being granted access to a platform or the type of the one or more authentication patterns needed to gain access to the platform, the system comprising:
a computing system having a non-transitory computer-readable medium comprising code, wherein instructions are executed by the computing system to perform:
maintaining a database, wherein the platform is in communication with the database, wherein the database stores data associated with the user that is collected from a user computing device;

receiving one or more elections from a user for an authentication sequence, the authentication sequence comprising one or more designated elections;

associating the one or more designated elections with the user associated with the user computing device wherein the one or more designated elections are stored with an identifier for the user in the database;

creating, an assortment of possible selections on one or more dynamic collections, the possible selections comprising the one or more designated elections from the user;

presenting a first dynamic collection to the user;

obtaining a first selection by the user on the user computing device;

comparing, by a processor the first selection selected by the user in the first dynamic collection to the authentication sequence associated with the user to determine if the first selection is related to the authentication sequence;

presenting an additional dynamic collection to the user, such that the user is not presented with a notification that the selected first selection in the first dynamic collection was related to the authentication sequence or was not related to the authentication sequence; and comparing, by the processor, an additional selection selected by the user in the one or more additional dynamic collections the authentication sequence associated with the user to determine if the selected additional selection is related to the authentication sequence associated with the user;

delaying the presentation of the one or more additional dynamic collections in response to a received selection from the user computing device that was not in the authentication sequence;

wherein the authentication sequence includes hot zone regions such that depending on a location where the user selects an selection of the dynamic collection determines if the user has selected a correct hotspot in the authentication sequence or an incorrect hotspot; and determining if access to the platform should be granted when a match from the comparison verifies the authenticity of a user's identity, wherein the system does not transmit a notification that any of the possible selections in the first dynamic collection or the one or more additional dynamic collections were related to the authentication sequence or that any of the possible selections in the first dynamic collection or the one or more additional dynamic collections were not related to the authentication sequence such that the user computing device does not present the user with any information that the user has initiated any steps in selecting a proper authentication sequence until being granted access to the platform.

11. The system of claim 10, wherein instructions are executed by the user computing device to further perform:
providing access if a predetermined amount of the possible selections by the user are related to the authentication sequence.

12. The system of claim 10, wherein instructions are executed by the user computing device to further perform:
providing access if the possible selections of the authentication sequence were selected in a specific order by the user.

13. The system of claim 10, wherein instructions are executed by the user computing device to further perform:
delaying the presentation of the one or more additional dynamic collections in response to a received selection from the user computing device that was not in the authentication sequence to create an illusion that the system is slowing down wherein a timing for the delaying of the presentation of the one or more additional dynamic collections is increased by addition, multiplication, or exponential power.

14. The system of claim 10, wherein instructions are executed by the user computing device to further perform:
determining if the user is within a predetermined time or geographic area; and
generating, in response to the user not being within a predetermined time or geographic area, a dynamic collection without designated selections on the user computing device such that the user is incapable of being granted access to the platform.

15. The system of claim 10, wherein instructions are executed by the user computing device to further perform:
assigning a positive point value for a selection by the user that is related to the authentication sequence;
assigning a negative point value for a selection by the user that is not related to the authentication sequence, the negative point value weighted more than the positive point value;
determining if a current point value is above a predetermined number; and
providing access if the current point value is above the predetermined number.

16. The system of claim 10, wherein the one or more elections are different circuitry of an electric circuit system wherein the different circuitry complete the authentication sequence.

17. The system of claim 10, wherein the one or more elections are numbers, wherein the numbers have a common second number, the common second number selected by the user such that the second number is divisible by numbers that a part of the authentication sequence.

* * * * *